(12) United States Patent
Reiter et al.

(10) Patent No.: US 12,544,127 B2
(45) Date of Patent: Feb. 10, 2026

(54) SENSOR SYSTEMS FOR USE IN CONNECTION WITH MEDICAL PROCEDURES

(71) Applicant: Buffalo Filter LLC, Lancaster, NY (US)

(72) Inventors: Jason David Reiter, West Seneca, NY (US); William Kellner, Amherst, NY (US); Jay Kajdas, Getzville, NY (US); Kyrylo Shvetsov, Depew, NY (US); Robert Scroggins, Union, KY (US); Gregory Pepe, Lancaster, NY (US); Samantha Bonano, Williamsville, NY (US)

(73) Assignee: Buffalo Filter LLC, Lancaster, NY (US)

( * ) Notice: Subject to any disclaimer, the term of this patent is extended or adjusted under 35 U.S.C. 154(b) by 0 days.

(21) Appl. No.: 15/615,556

(22) Filed: Jun. 6, 2017

(65) Prior Publication Data

US 2017/0348047 A1    Dec. 7, 2017

Related U.S. Application Data

(60) Provisional application No. 62/345,930, filed on Jun. 6, 2016, provisional application No. 62/397,883, filed on Sep. 21, 2016.

(51) Int. Cl.
*A61B 18/14* (2006.01)
*A61B 5/00* (2006.01)
(Continued)

(52) U.S. Cl.
CPC ...... *A61B 18/1487* (2013.01); *A61B 5/14542* (2013.01); *A61B 5/1459* (2013.01);
(Continued)

(58) Field of Classification Search
CPC ............ A61B 18/1487; A61B 18/1402; A61B 18/1206; A61B 2018/00601;
(Continued)

(56) References Cited

U.S. PATENT DOCUMENTS

2002/0008625 A1    1/2002  Adams et al.
2005/0080408 A1*   4/2005  Seid ................... A61B 18/1402
                                                          606/34
(Continued)

FOREIGN PATENT DOCUMENTS

CN    203116916 U   8/2013
GB      2497322 A   6/2013
(Continued)

OTHER PUBLICATIONS

U. S. Patent and Trademark Office (ISA/US), International Search Report and Written Opinion (WO/ISA) from corresponding PCT International Application No. PCT/US2017/036215, dated Nov. 7, 2017.

*Primary Examiner* — Linda C Dvorak
*Assistant Examiner* — Bradford C. Blaise
(74) *Attorney, Agent, or Firm* — Timothy W. Menasco, Esq.; Harter Secrest & Emery LLP

(57) ABSTRACT

Embodiments of the present disclosure provide a method and apparatus for sensing. An exemplary apparatus includes a surgical device, a control unit comprising a user interface, a power unit, a motor, a warning element, a processor, and a memory including computer program instructions, the user interface operable to select between an on or off setting for the apparatus, the power unit operable to connect with a power source. The apparatus further includes a sensor located on at least one of the surgical device and the control unit, the sensor operable to sense a presence of gases, and a conduit comprising a vacuum tube fluidly coupled to the surgical device and the control unit, and a communication (Continued)

line operable to transmit electronic signals between the surgical device, the control unit and the sensor.

4 Claims, 9 Drawing Sheets

(51) Int. Cl.
    *A61B 5/145*     (2006.01)
    *A61B 5/1459*     (2006.01)
    *A61B 17/00*     (2006.01)
    *A61B 17/34*     (2006.01)
    *A61B 18/00*     (2006.01)
    *A61B 18/12*     (2006.01)
    *G01N 33/00*     (2006.01)
    *G16H 20/40*     (2018.01)
    *G16H 40/63*     (2018.01)

(52) U.S. Cl.
    CPC ........ *A61B 5/6847* (2013.01); *A61B 17/3474* (2013.01); *A61B 18/1206* (2013.01); *A61B 18/1402* (2013.01); *G01N 33/0036* (2013.01); *G01N 33/0063* (2013.01); *A61B 2017/00022* (2013.01); *A61B 2017/00061* (2013.01); *A61B 2017/00084* (2013.01); *A61B 2017/00119* (2013.01); *A61B 2017/0023* (2013.01); *A61B 2018/00601* (2013.01); *A61B 2018/00678* (2013.01); *A61B 2018/00708* (2013.01); *A61B 2018/00773* (2013.01); *A61B 2018/00898* (2013.01); *A61B 2018/1412* (2013.01); *A61B 2218/008* (2013.01); *A61B 2505/05* (2013.01); *A61B 2560/0487* (2013.01); *G16H 20/40* (2018.01); *G16H 40/63* (2018.01)

(58) Field of Classification Search
    CPC .......... A61B 2018/00678; A61B 2018/00708; A61B 2018/00773; A61B 2018/00898; A61B 2018/1412; A61B 17/3474; A61B 2017/00022; A61B 2017/00061; A61B 2017/00084; A61B 2017/00119; A61B 2017/0023; A61B 5/14542; A61B 5/1459; A61B 5/6847; A61B 2505/05; A61B 2560/0487; A61B 2218/008; A61B 2017/00115; A61B 2017/00199; A61B 2017/00225; A61B 2218/001; G01N 33/0063
    See application file for complete search history.

(56) References Cited

U.S. PATENT DOCUMENTS

| | | |
|---|---|---|
| 2006/0058784 A1 | 3/2006 | Gedebou |
| 2008/0243118 A1* | 10/2008 | Buchman ........... A61B 18/1402 |
| | | 606/41 |
| 2010/0036374 A1 | 2/2010 | Ward |
| 2010/0185139 A1 | 7/2010 | Stearns et al. |
| 2011/0071582 A1 | 3/2011 | Willyard et al. |
| 2011/0190768 A1* | 8/2011 | Shvetsov ............... A61B 18/18 |
| | | 606/48 |
| 2013/0098365 A1 | 4/2013 | Bohner |
| 2014/0031814 A1* | 1/2014 | Deutscher ............. G01N 21/27 |
| | | 606/34 |
| 2014/0187870 A1 | 7/2014 | Weber |
| 2014/0188128 A1 | 7/2014 | Weber |
| 2015/0112246 A1* | 4/2015 | Palmerton ........... A61M 13/003 |
| | | 604/26 |
| 2015/0202391 A1 | 7/2015 | Stearns et al. |

FOREIGN PATENT DOCUMENTS

| | | |
|---|---|---|
| WO | 9400060 A1 | 1/1994 |
| WO | 2015088473 A1 | 6/2015 |

\* cited by examiner

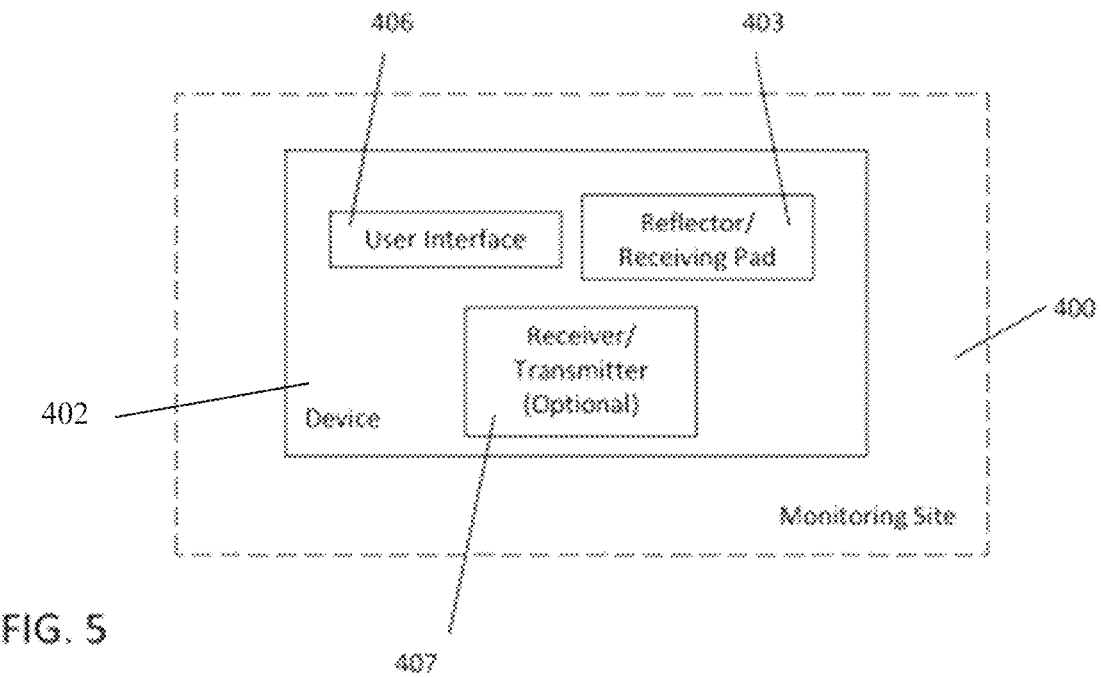
FIG. 5
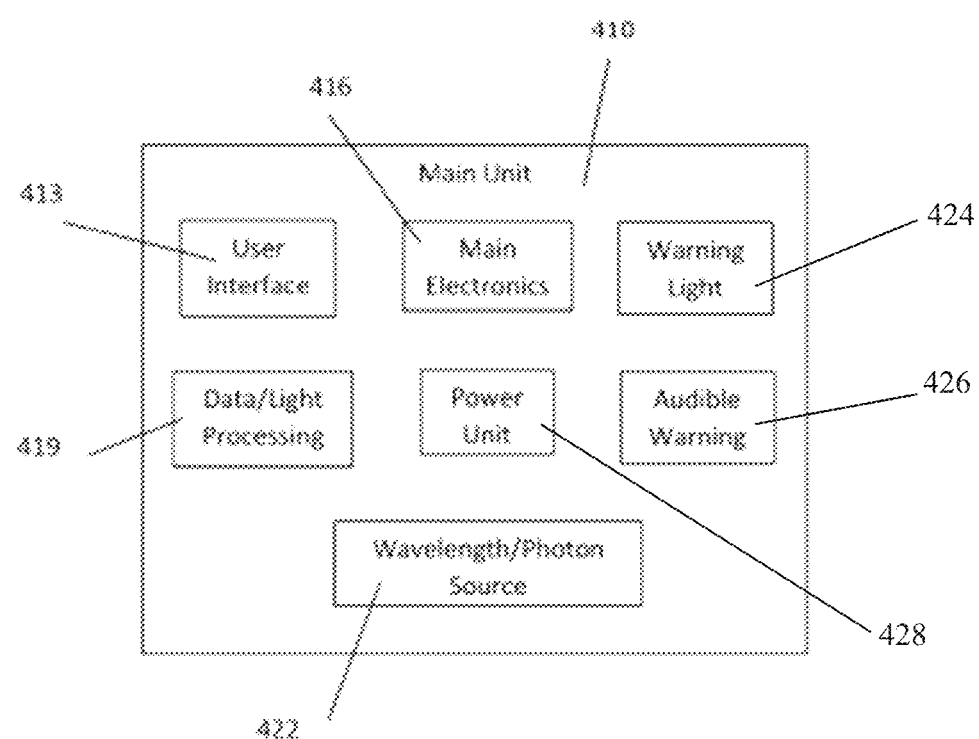

SENSOR SYSTEMS FOR USE IN CONNECTION WITH MEDICAL PROCEDURES

FIELD OF THE INVENTION

The present invention relates generally to sensor systems and methods of using such systems in connection with surgical procedures.

BACKGROUND OF THE INVENTION

Currently, there exists some procedures for surgical staff to mitigate the risk of fire, in a surgical environment, due to elevated concentrations of oxygen. However, there is no device to detect oxygen, and/or other gases/chemicals, that could provide an early warning to the staff to remove the ignition source and/or adjust the oxygen source. Oxygen delivery to the patient does not occur in a closed system, and leaking oxygen may propagate to the surgical site, elevating the concentration. At the surgical site there exists an abundance of fuels, and an ignition source in close proximity to those fuels. A warning system could provide medical staff with an early warning so that they could take action to reduce the risk of fire.

SUMMARY OF THE INVENTION

With parenthetical reference to the corresponding parts, portions or surfaces of the disclosed embodiment, merely for the purposes of illustration and not by way of limitation, the present invention meets the above described need by providing a sensor system (10) for use during surgical procedures that may be incorporated into trocars and electrosurgical devices. In a first embodiment, an electrosurgical device (10) having a cutting blade (13), a user interface (16) for selecting between on/off and cut/coagulate functions, and a vacuum tube (19) for evacuation of surgical smoke. The electrosurgical device (10) may also be provided with visual and audible warning indicators (22, 25). As shown, the electrosurgical device (10) will be located in a monitoring/surgical site (28). The electrosurgical device (10) may also include a sensor (31). The sensor (31) may be designed to detect oxygen concentrations at the monitoring/surgical site (28). The sensor (31) may also be designed to detect the presence of other gases or chemicals. Some examples of technologies for targeting oxygen, and/or other gases/chemicals, include: luminescence spectroscopy; imaging (e.g., hyperspectral, multispectral, etc.); electrochemical; paramagnetic; Quartz Crystal Microbalancing (QCM); Quantum Dots (QD's)/indicator strips or dots; ultrasonic; and utilizing refractive properties of light. Some examples of sensor technologies for targeting temperature include: thermocouples; thermistors; Resistive Temperature Devices (RTD); integrated silicone based sensor; infrared (pyrometers); Bragg Grating; Interferometric; Raman (DTS); Brillouin (DTSS); and thermal pile. Sensors for gases include, but are not limited to: $CO_2$, CO and alcohol.

Data from the sensors (31) may be transferred along communication lines (35) to a main control unit (38). The main unit (38) includes processors for interacting with the electronics on board the electrosurgical device (10) and for processing the data received from the sensors. The unit (38) may include a user interface (41). The main unit (38) may include a smoke evacuation system (65) to remove surgical smoke and debris from the surgical site and/or an electrosurgical system (68) to control an electrosurgical device (10). Also, the main unit (38) may include visual and audible warning indicators (48) and (51). The main unit (38) also includes a sensor module (54) for communicating with the sensor(s) (31) and processing the data received. The sensor module (54) may also communicate with the main electronics. The unit (38) may also include a main electronics board (59) for handling the whole system (i.e. controlling the electrosurgical device, controlling the smoke evacuation system, utilizing data received from the sensors (31), and triggering the audible warning and/or warning light). A power unit (62) provides power for the entire system.

In a second embodiment, a monitoring site (100) such as a surgical area for a laparoscopic procedure is shown. A trocar (103) may be inserted into a cavity of a patient for a laparoscopic procedure. The trocar (103) may provide for insufflation of the cavity through an insufflator or the like. The pressurization of the cavity, such as a peritoneal cavity, provides space for manipulating instruments inside the cavity. While the insufflator introduces gas into the cavity, gases are removed from the cavity through an outlet that conveys the gas through a filter (106). The filter removes smoke and debris from the gas. The gas may be conveyed to the main unit (112) where it may enter a sensor (115) to test for oxygen levels, the presence of other gases, temperature or the like. The main unit (112) may be provided with electrical output, fiber optic, or other data transmission lines (118) for sending warning signals to visual warnings (121) and/or auditory warnings (124), disposed in the surgical theater near the monitoring site (100). The main unit (112) may be provided with a user interface (127), a sensor processing (130), a power unit (133), a pump (136) for drawing gas from the surgical site, an audible warning (139), and a visual warning (142). The unit (112) includes a main processor (145) that provides for controlling the overall functionality and processing of the system.

In a third embodiment, the present invention may also provide for remote sensing features for a sensing system. The remote sensor (200) may be provided with sensing film or sensing technology (e.g. sensor spot, chemical coating, etc.) (203), and a processor (202) to control the functions of the remote sensor (200) [e.g. user interface (201), audible warning (206), warning light (209), and receiver/transmitter (210)] The remote sensor (200) may also transmit a wireless signal via receiver/transmitter (210) to a main processing unit (212) disposed at a remote location. The main processing unit (212) may include a receiver/transmitter (213) for communicating with the remote sensor (200) via wireless signal. The main processing unit (212) may also include a user interface (215), a sensor processing module (218), a power unit (221), a main electronics board (224), audible warnings (227), and/or visual warnings (230).

In a fourth embodiment, an imaging device is utilized to view the monitoring site (300). The imaging device may include sensor film or sensing technology (e.g. sensor spot, chemical coating, etc.) (303). A secondary camera (306) and a tertiary camera (309) may also be included, with the potential for the cameras to have a receiver/transmitter (307, 308) for communication. A main unit (310) may include a user interface (313), a primary camera (316), a processor (319) for processing image data, audible and/or visual alarms (322, 325), a power unit (328) and a main processor (331). The main unit (310) may also include a receiver/transmitter (329) to communicate with the supplemental cameras, or it may utilize communication lines (332, 334) to communicate with the supplemental cameras. The imaging technology may utilize spectroscopy technologies for sensing oxygen. When the oxygen reaches a certain level, a warning may be triggered.

In a fifth embodiment, the presence of oxygen may be detected by utilizing properties of light. A device (402) having a reflector/receiving pad (403) and a user interface (406) may be provided at the monitoring site (400). The device (402) may also include a receiver/transmitter (407) to communicate with the main unit (410). A main unit (410) may be provided with a user interface (413), a main processor (416), a data/light processor (419) for processing light properties or data received from the reflector/receiving pad (403). A wavelength/photon source (422) generates light for transmission to the reflector/receiving pad. The main unit (410) operates the overall system.

A sixth exemplary of the present disclosure provides an apparatus for sensing during medical procedures. The apparatus includes a surgical device, and a control unit comprising a user interface, a power unit, a motor, a warning element, a processor, and a memory including computer program instructions, the user interface operable to select between an on or off setting for the apparatus, the power unit operable to connect with a power source. The apparatus further includes a sensor located on at least one of the surgical device and the control unit, the sensor operable to sense a presence of gases, and a conduit comprising a vacuum tube fluidly coupled to the surgical device and the control unit, and a communication line operable to transmit electronic signals between the surgical device, the control unit and the sensor, wherein the power unit operable to provide power to the surgical device, the control unit and the sensor, and wherein the motor is operable to urge a fluid to pass from the surgical device through the conduit to the control unit.

A seventh exemplary embodiment of the present disclosure provides an apparatus for sensing during medical procedures. The apparatus includes a remote sensing device comprising a user interface, a sensor, a processor, a memory including computer program instructions, a receiver, and a transmitter, the processor with the memory including the computer program instructions being operable to control the user interface, the sensor, the receiver, and the transmitter. The apparatus further includes a control unit comprising a control user interface, a power unit, a warning element, control receiver, a control transmitter, a control processor, and a control memory including control computer program instructions, the user interface operable to select between an on or off setting for the apparatus, the power unit operable to connect with a power source, wherein the remote sensing device with the receiver and the transmitter is operable to communicate with the control unit with the control receiver and the control transmitter, wherein the sensor is operable to sense a presence of gases relative to the remote sensing device, and wherein the control processor with the control memory including the control computer program instructions is operable to active the warning element in response to sensed gas.

An eighth exemplary embodiment of the present disclosure provides apparatus for sensing during medical procedures. The apparatus includes a monitoring device including a user interface and a reflector pad. The apparatus further includes a control unit comprising a control user interface, a power unit, a processor, a memory including computer program instructions, a photon emitter, a light processor, and a warning element, wherein the photon generate light for transmission to the reflector pad, wherein the reflector pad is operable to reflect light received from the photon emitter to the light processor, wherein the light processor with the processor and the memory including computer program instructions are operable to determine a presence of oxygen between the monitoring device and the control unit.

A ninth exemplary embodiment of the present disclosure provides an apparatus for sensing during medical procedures. The apparatus includes a remote sensing device including a user interface, a sensor, a remote light, a remote audible indicator, a processor, a memory including computer program instructions, a receiver, and a transmitter, the processor with the memory including the computer program instructions being operable to control the user interface, the sensor, the receiver, and the transmitter. The apparatus further includes a control unit comprising a control user interface, a power unit, a warning element, control receiver, a control transmitter, a control processor, and a control memory including control computer program instructions, the user interface operable to select between an on or off setting for the apparatus, the power unit operable to connect with a power source, wherein the remote sensing device with the receiver and the transmitter is operable to communicate with the control unit with the control receiver and the control transmitter, wherein the sensor is operable to sense a presence of gases relative to the remote sensing device, and wherein the control processor with the control memory including the control computer program instructions is operable to activate the warning element in response to sensed gas.

The following will describe embodiments of the present disclosure, but it should be appreciated that the present disclosure is not limited to the described embodiments and various modifications of the invention are possible without departing from the basic principle. The scope of the present disclosure is therefore to be determined solely by the appended claims.

BRIEF DESCRIPTION OF THE DRAWINGS

FIG. 5 is a block diagram of a detection system utilizing properties of light.

DETAILED DESCRIPTION OF THE INVENTION

Figure 1:
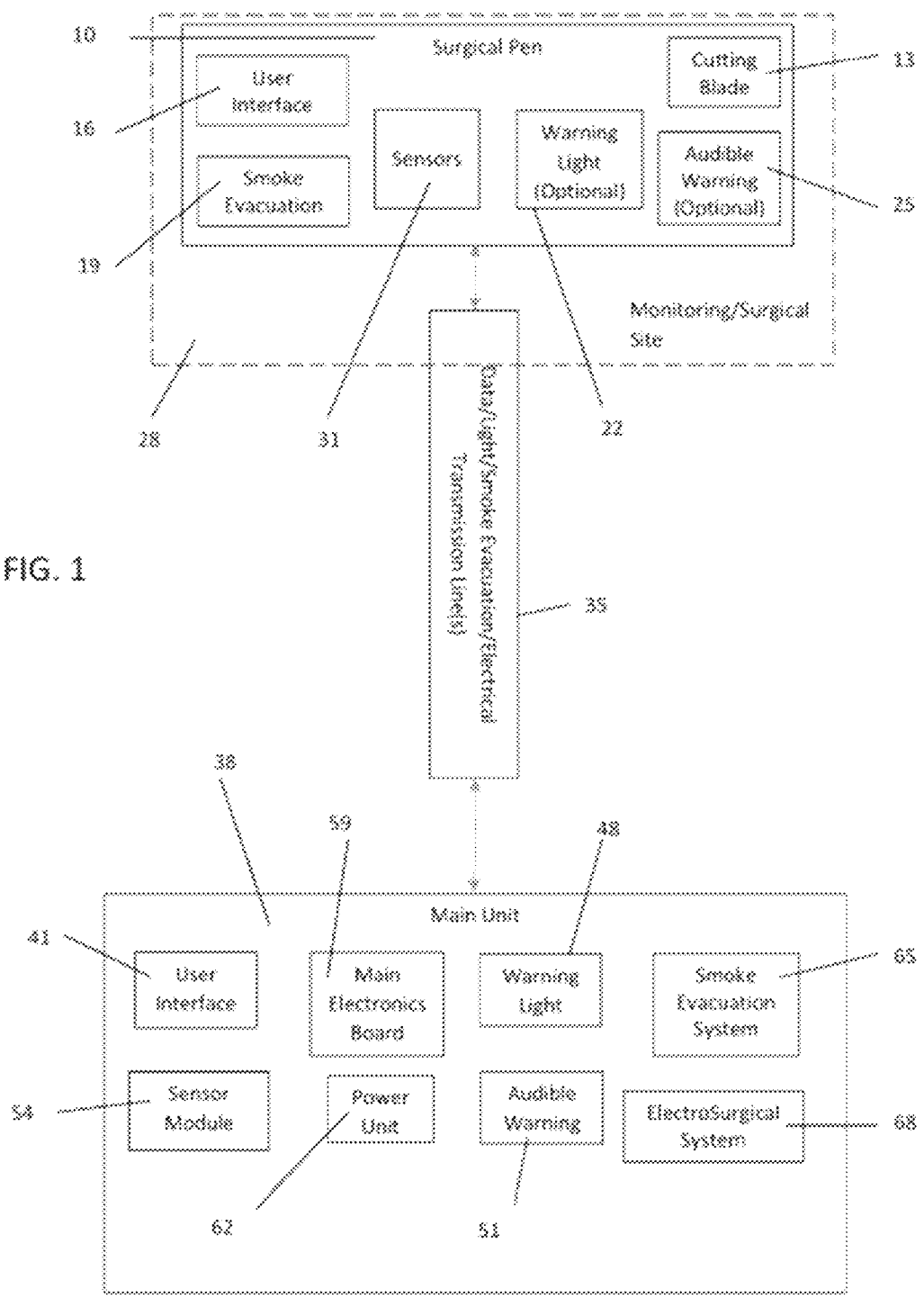
FIG. 1 is a block diagram of a first embodiment of the invention shown in connection with an electrosurgical device.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

The purpose of the device is to monitor the concentration of oxygen in medical environments for the purposes of providing a warning for elevated oxygen concentrations and mitigating risks of fires due to elevated oxygen levels. Based on the sensors utilized, the device of the present invention may also be used to identify potential fire hazards due to other gases or chemicals.

Referring now to the drawings, and more particularly to FIG. 1 thereof, this invention provides an electrosurgical device 10 having a cutting blade 13, a user interface 16 for selecting between on/off and cut/coagulate functions, and a vacuum tube 19 for evacuation of surgical smoke. An example of an electrosurgical device 10 is shown in U.S. Pat. No. 9,289,261 which is incorporated herein by reference. The electrosurgical device 10 may also be provided with visual and audible warning indicators 22, 25. As shown, the electrosurgical device 10 will be located in a monitoring/surgical site 28. The electrosurgical device 10 may also include a sensor 31. The sensor 31 may be designed to detect oxygen concentrations at the monitoring/surgical site 28. The sensor 31 may also be designed to detect the presence of other gases or chemicals or properties. Some examples of technologies for targeting oxygen, and/or other gases/chemicals include: luminescence spectroscopy; imaging (e.g., hyperspectral, multispectral, etc.); electrochemical; paramagnetic; Quartz Crystal Microbalancing (QCM); Quantum Dots (QD's)/indicator strips or dots; ultrasonic; and utilizing refractive properties of light. Some examples of sensor technologies for targeting temperature include: thermocouples; thermistors; Resistive Temperature Devices (RTD); integrated silicone based sensor; infrared (pyrometers); Bragg Grating; Interferometric; Raman (DTS); Brillouin (DTSS); and thermal pile. Sensors for gases include, but are not limited to: $CO_2$, CO and alcohol.

Data from the sensor 31 may be transferred along communication lines 35 to a main control unit 38. The main unit 38 (or control unit) includes processors for interacting with the electronics on board the electrosurgical device and for processing the data received from the sensor. The main unit 38 may include a user interface 41. The main unit 38 may include a smoke evacuation system (65) to remove surgical smoke and debris from the surgical site and/or an electro surgical system (68) to control an electrosurgical device (10). Also, the main unit 38 may include visual and audible warning indicators 48 and 51. The main unit 38 also includes a sensor module 54 for communicating with the sensor(s) 31 and processing the data received. The sensor module 54 may also communicate with the main electronics. The unit 38 may also include a main electronics board 59 for handling the whole system (i.e., controlling the electrosurgical device, controlling the smoke evacuation system, utilizing data received from the sensor 31, and triggering the audible warning and/or warning light). A power unit 62 provides power for the entire system.

Figure 2:
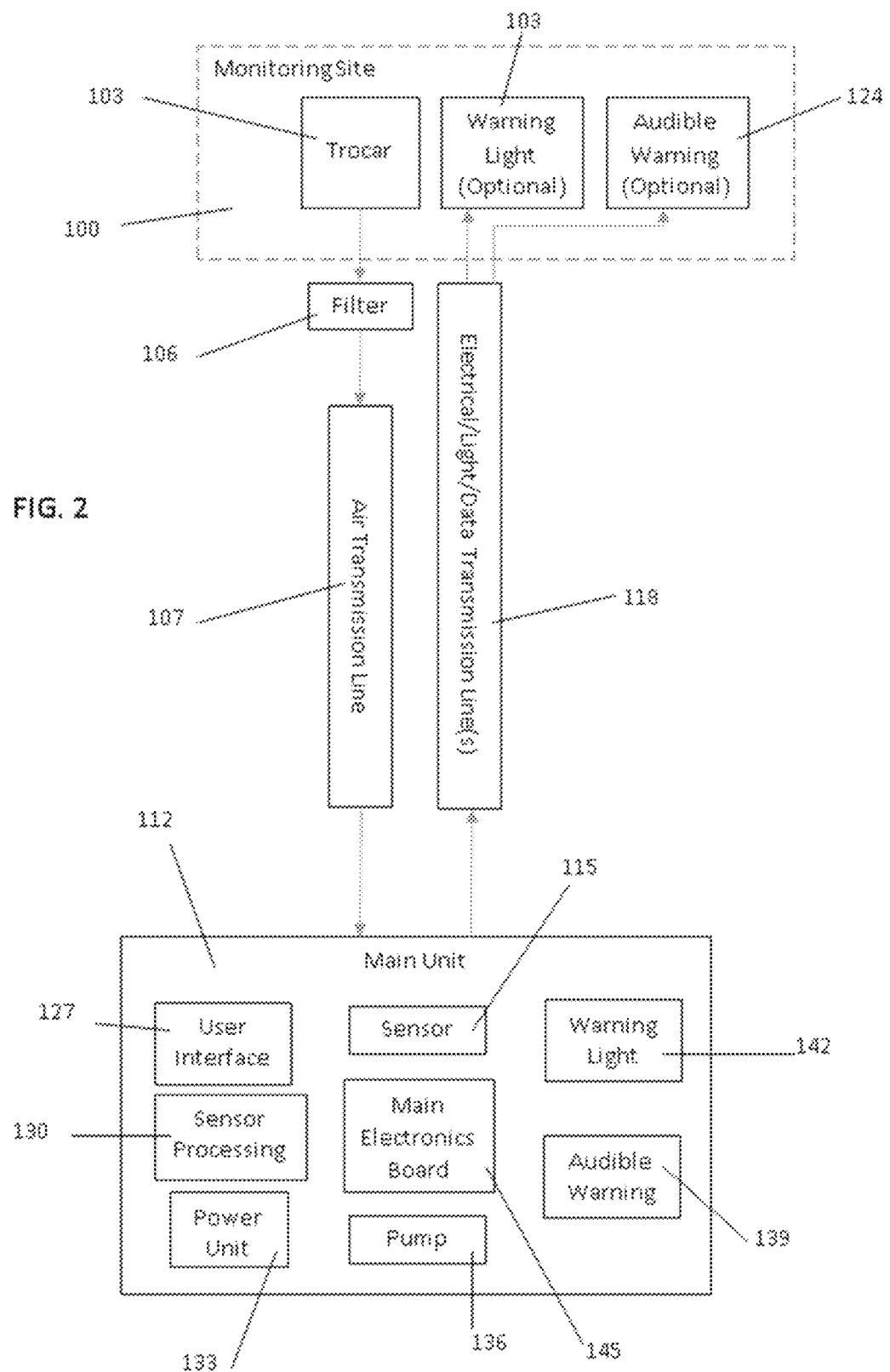
FIG. 2 is a block diagram of an alternate embodiment of the invention shown in connection with a laparoscopic procedure utilizing a trocar.

Turning to FIG. 2, a monitoring site 100 such as a surgical area for a laparoscopic procedure is shown. A trocar 103 may be inserted into a cavity of a patient for a laparoscopic procedure. The trocar 103 may provide for insufflation of the cavity through an insufflator or the like via air transmission line 107 and main unit 112. The pressurization of the cavity such as a peritoneal cavity provides space for manipulating instruments inside the cavity. While the insufflator introduces gas into the cavity, gases are removed from the cavity through an outlet that conveys the gas through a filter 106. The filter removes smoke and debris from the gas. The gas may be conveyed to the main unit 112 through air transmission line 107 where it may enter a sensor 115 to test for oxygen levels, the presence of other gases, temperature or the like. The main unit 112 may be provided with electrical output, fiber optic, or other data transmission lines 118 (or conduit) for sending warning signals to visual warnings 121 and/or auditory warnings 124, disposed in the surgical theater near the monitoring site 100. The main unit 112 may be provided with a user interface 127, a sensor processing unit 130, a power unit 133, a pump 136 for drawing gas from the surgical site, an audible warning 139 and a visual warning 142. The unit 112 includes a main processor 145 that provides for controlling the overall functionality and processing of the system.

Figure 3:
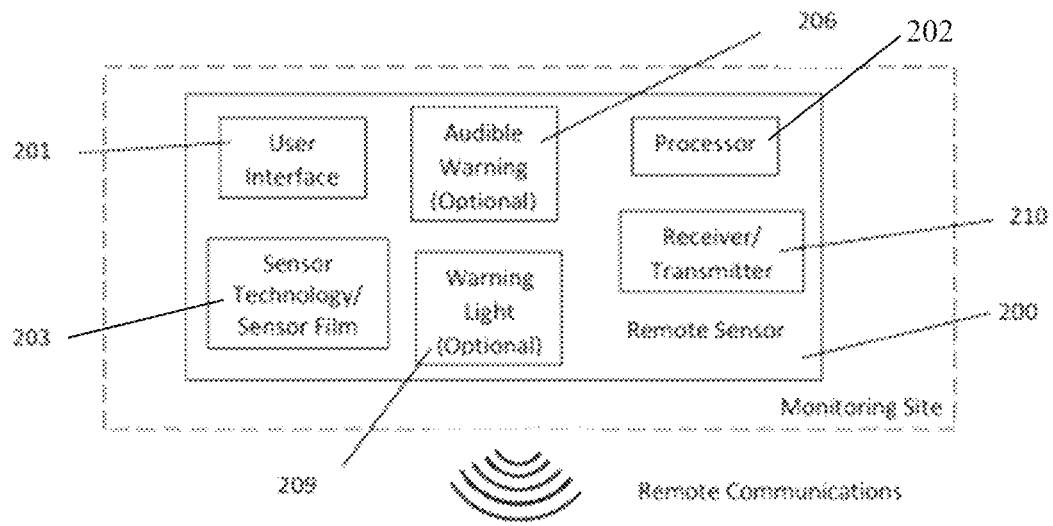
FIG. 3 is a block diagram of a remote sensing system of the present invention.
Figure 3:
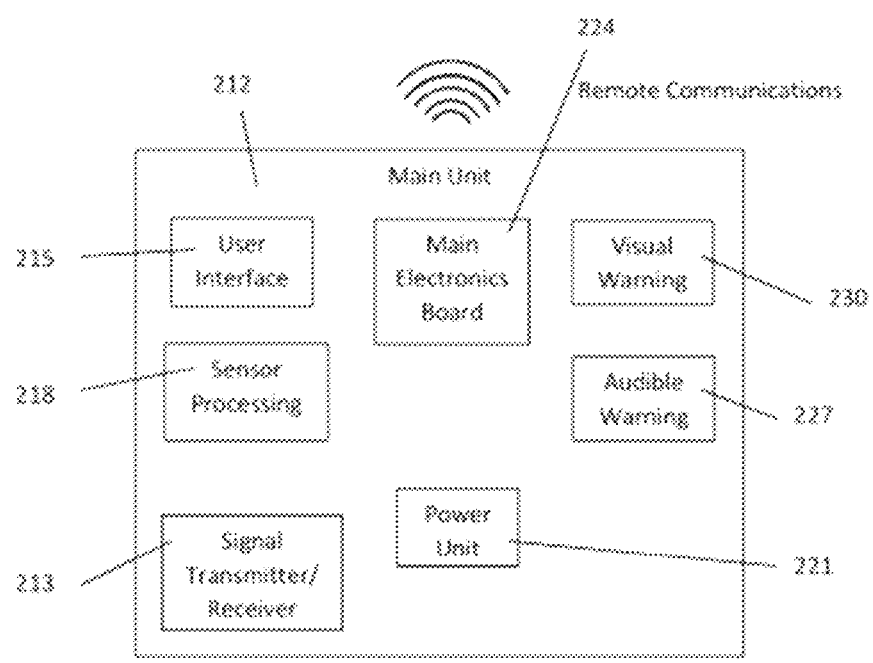

Turning to FIG. 3, the present invention may also provide for remote sensing features for a sensing system. The remote sensor 200 may be provided with sensing film or sensing technology (e.g., sensor spot, chemical coating, etc.), and a processor 202 to control the functions of the remote sensor 200 (e.g., user interface 201, audible warning 206, warning light 209, and receiver/transmitter 210). The remote sensor 200 may also transmit a wireless signal via receiver/transmitter 210 to a main processing unit 212 disposed at a remote location. The main processing unit 212 may include a receiver/transmitter 213 for communicating with the remote sensor 200 via wireless signal. The main processing unit 212 may also include a user interface 215, a sensor processing module 218, a power unit 221, a main electronics board 224, audible warnings 227, and/or visual warnings 230.

Figure 4:
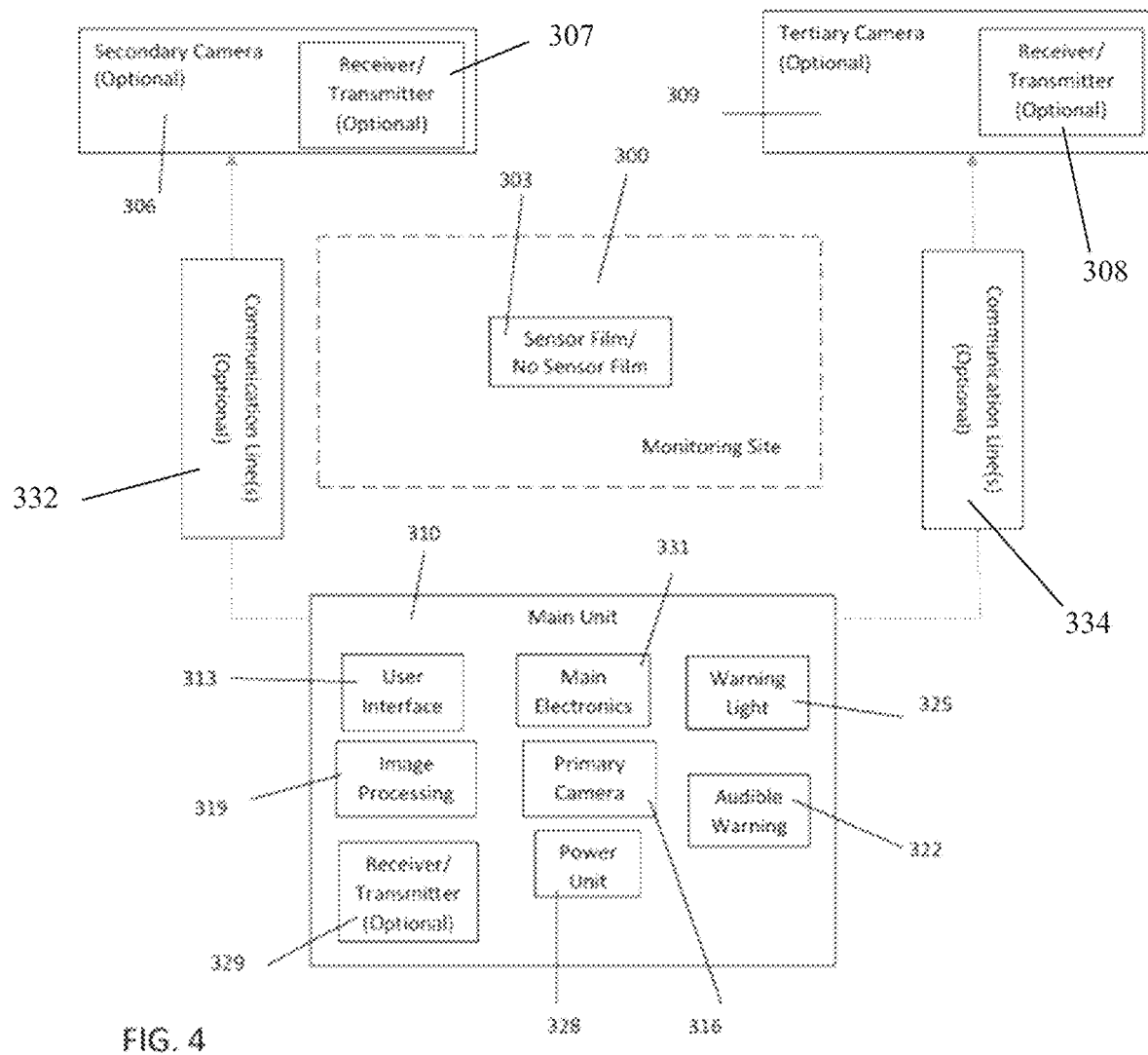
FIG. 4 is a block diagram of an imaging system of the present invention.

Turning to FIG. 4, the present invention may also provide an imaging device is utilized to view the monitoring site 300. The imaging device may include sensor film or sensing technology (e.g., sensor spot, chemical coating, etc.) 303. A secondary camera 306 and a tertiary camera 309 may also be included, with the potential for the cameras to have a receiver/transmitter 307, 308 for communication. A main unit 310 may include a user interface 313, a primary camera 316, a processor 319 for processing image data, audible and/or visual warning 322, 325, a power unit 328 and a main processor 331. The main unit 310 may also include a receiver/transmitter 329 to communicate with the supplemental cameras, or it may utilize communication lines 332, 334 to communicate with the supplemental cameras 306, 309. The imaging technology may utilize spectroscopy technologies for sensing oxygen. When the oxygen reaches a certain level, a warning may be triggered.

In FIG. 5, the presence of oxygen may be detected by utilizing properties of light. A device having a reflector/receiving pad 403 and a user interface 406 may be provided at the monitoring site 400. The device may also include a receiver/transmitter 407 to communicate with the main unit

410. A main unit 410 may be provided with a user interface 413, a main processor 416, a data/light processor 419 for processing light properties or data received from the reflector/receiving pad 403. A wavelength/photon source 422 generates light for transmission to the reflector/receiving pad. The main unit 410 operates the overall system.

Figure 6:
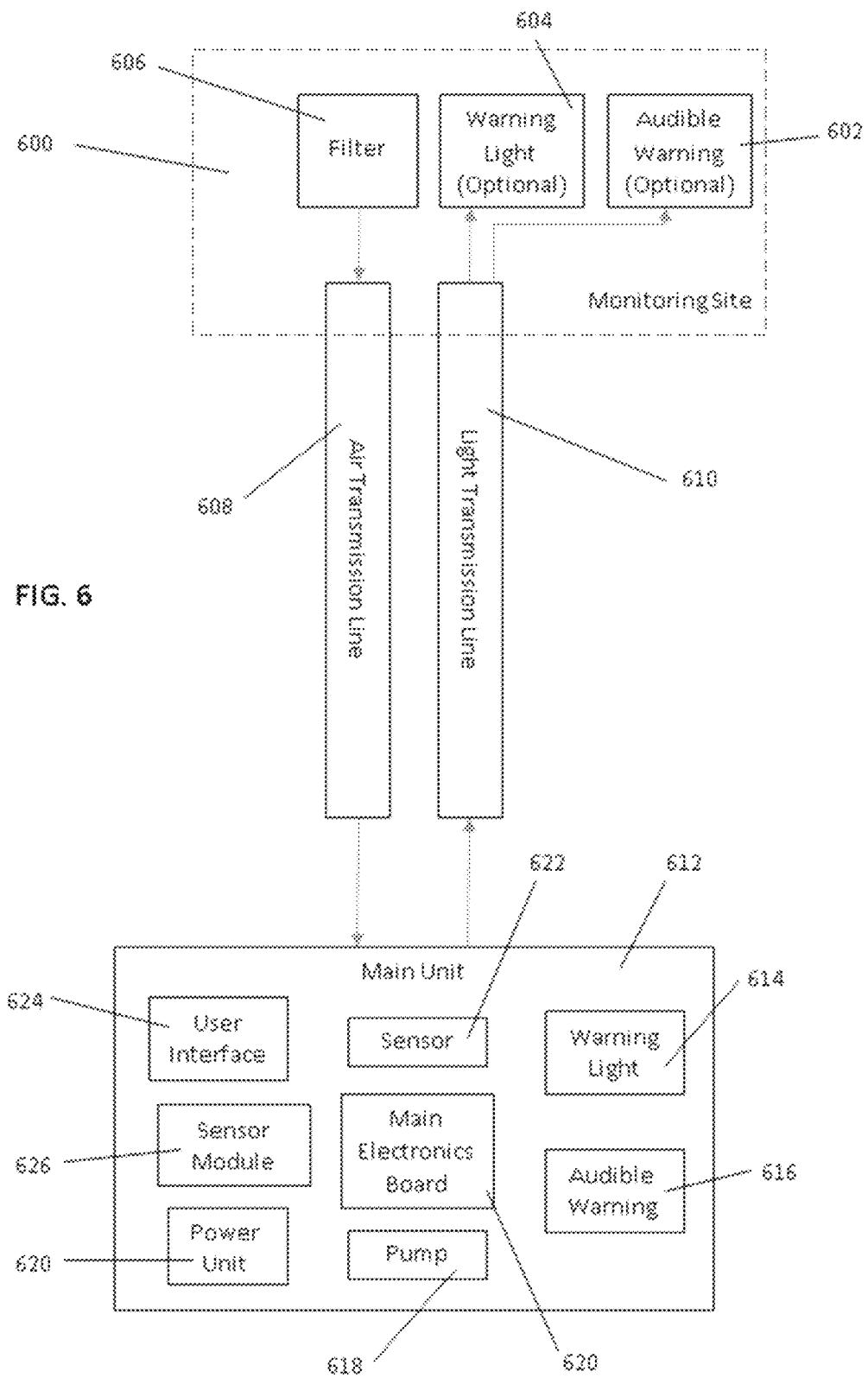
FIG. 6 is a block diagram of an alternate embodiment with one or more sensors for detecting the concentration levels at the monitoring site.

In FIG. 6, illustrated is a block diagram of an alternate embodiment wherein the system is operable to pull air from the surgical site to the main housing where it detects the concentration levels of oxygen and/or other gases. The embodiment illustrated in FIG. 6 can be used in laparoscopic surgery as well as any other type of surgery. Shown in FIG. 6 is filter 606 located at monitoring site 600 operable to remove smoke and debris from a gas. Also optionally shown at monitoring site 600 is warning light 604 and audible warning 602. Filter 606 is fluidly coupled to air transmission line 608, which is also fluidly coupled to main unit 612. Warning light 604 and audible warning 602 are coupled to light transmission line 610 which is coupled to main unit 612. Main unit 612 includes a main electronics board 620, which includes a processor and a memory including computer program instructions. Main unit 612 also includes warning light 614, audible warning 616, pump 618, power unit 620, sensor module 626, user interface 624 and sensor 622.

Power unit 620 provides power to main unit 612. Main electronics board 620 with its processor and memory including computer program instructions is operable to control each of the elements of main unit 612. Pump 618 may include a motor operable to urge air or gas to pass through filter 606 through air transmission line 608. User interface 624 any combination of displays and on/off switches for operating the entire device shown in FIG. 6. Sensors 622 are operable to sense oxygen or gas concentration levels. Sensor module 626 is operable to interpret the sensed data. It should be appreciated that sensor module 626 may be included with main electronics board 620 as part of the processor.

Figure 7:
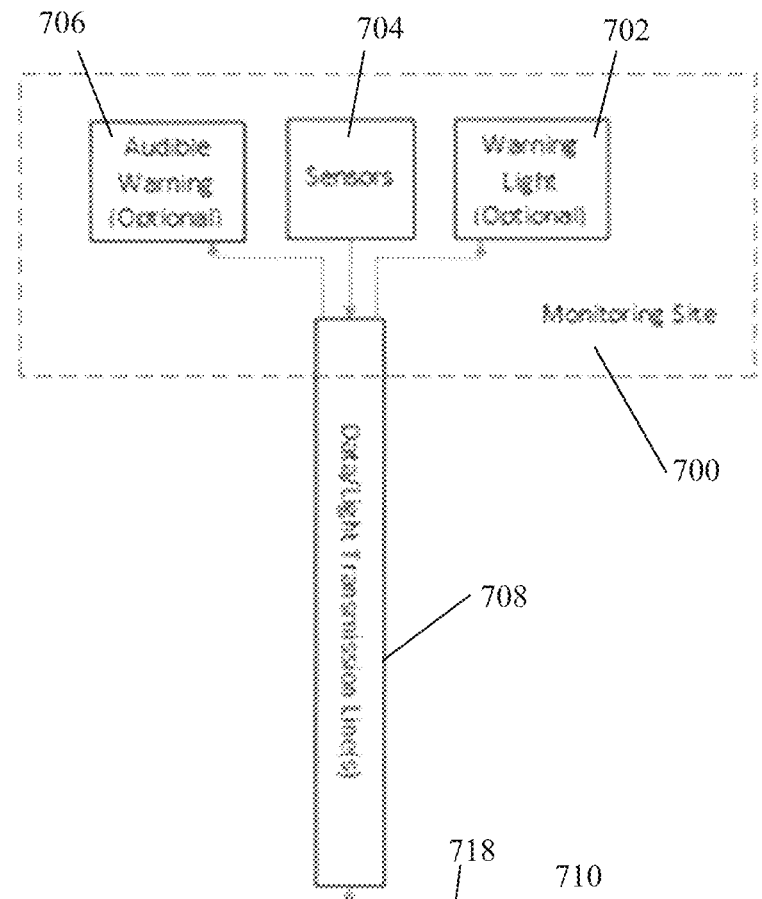
FIG. 7 is a block diagram of an alternate embodiment where the system pulls air from the surgical site to the main housing where it detects the concentration levels.
Figure 7:
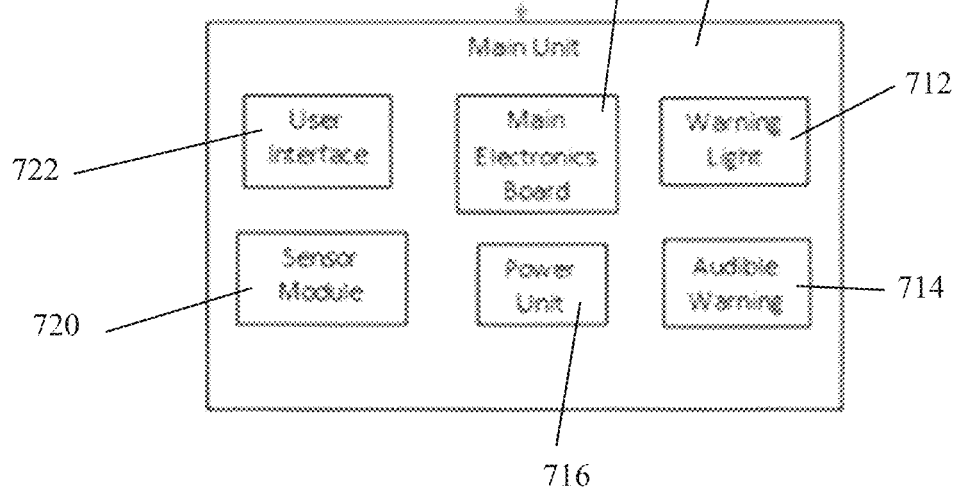

Referring to FIG. 7, illustrated is a block diagram of an alternate embodiment with one or more sensors for detecting the concentration levels of oxygen and/or other gases at the monitoring site or surgical site. Shown in FIG. 7 is monitoring site 700 such as a surgical area or area of a patient that is of medical interest. Sensors 704 are operable to be located at the monitoring site 700. Sensors 704 may be operable to detect oxygen concentrations or whether oxygen concentrations or other gases at the monitoring site 700 are above a predetermined threshold. An exemplary threshold would be a concentration of oxygen which is indicative of an environment with enough oxygen to become flammable. Sensors 704 may also be operable to detect the presence of other gases, or chemicals at or relative to monitoring site 700. Included with sensors 704 at the monitoring site 700 are audible warning element 706 and warning light 702. It should be appreciated that embodiments include presence or absence of audible warning element 706 and warning light 702. Data from sensor 704 may be transferred along data/light transmission line 708 to main unit 710. The main unit 710 shown in FIG. 7 is operable to process the information from the one or multiple sensors. The main unit 710 include a main electronics board 718, which may include a processor and a memory including computer program instructions for controlling the system depicted in FIG. 7, utilizing data received from sensors 704, determining whether the data received from sensors 704 is above a predetermined threshold, and triggering the audible warning and/or warning lights. Main unit 710 also includes a power unit 716 operable to provide power for the entire system illustrated in FIG. 7. Also shown within main unit 710 are warning light 712, audible warning 714, sensor module 720, and user interface 722.

User interface 722 include on/off buttons for operating the main unit 710. Sensor module 720 is operable for communicating with the sensors 704 and processing the data received. The sensor module 720 may also communicate with the main electronics of main unit 710.

In practice, sensors 704 are operable to be located at a monitoring site 700 (e.g., a surgical site) to sense a centration of oxygen or other gases. Sensors 704 are operable to transmit through data/light transmission line 708 the sensed centration levels to main unit 710. Main unit 710 with its main electronics board 718 having a process 711, memory 713 including computer program instructions are operable to determine whether the to activate the warning light 712 and/or the audible warning 714 if the sensed oxygen or other gases are above a predetermined threshold. The main unit 710 is also operable to activate audible warning 706 and warning light 702 should they be present in the system.

Figure 8:
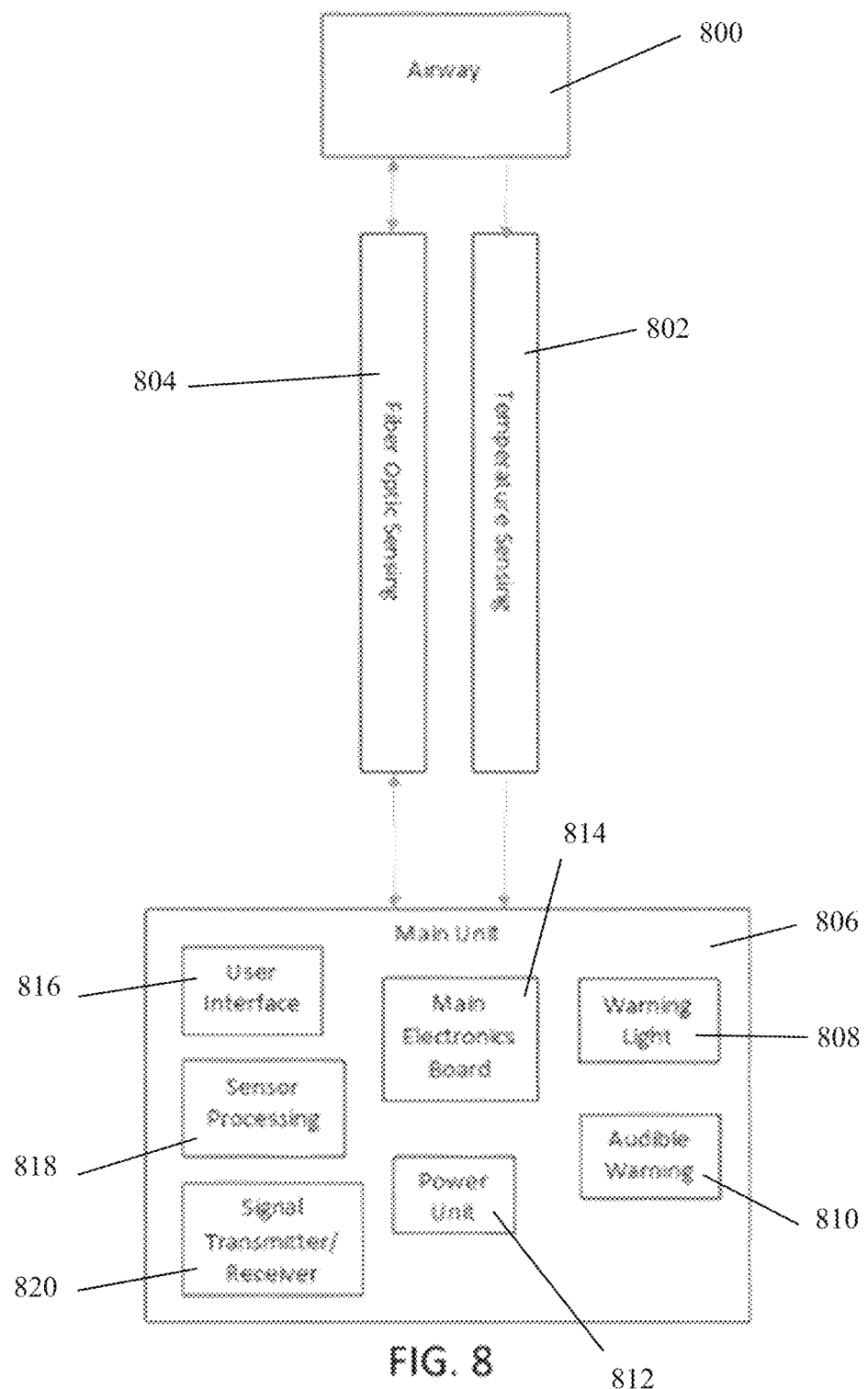
FIG. 8 is a block diagram of an alternate embodiment operable to sense within a patient airway.

Reference is now made to FIG. 8, which depicts an alternate embodiment of a device operable to sense or detect the concentration levels of oxygen and/or other gases within or around an endotracheal intubation tube. Shown in in FIG. 8 is airway 800, which is representative of a person's airway (e.g., throat airway passage). Temperature sensing element 802 and fiber optic sensing element 804 are operable to be placed through airway 800. For example temperature sensing element 802 may include a tube shaped thermometer device and fiber optic sensing element 804 may also tube shaped such that they are able to be located down a person's throat passages; or may be attached/embedded in an endotracheal tube. Temperature sensing element 802 and fiber optic sensing element 804 are coupled and in communication with main unit 806. Main unit 806 includes a main electronics board 814, power unit 812, warning light 808, audible warning 810, user interface 816, sensor processing 818 and signal transmitter/receiver 820 for communicating with temperature sensing element 802 and fiber optic sensing element 804. Main electronics board 814 may include a processor and a memory including computer program instructions. Embodiments of the temperature sensing element 802 and fiber optic sensing element 804 are operable to be attached or integrated in an endotracheal intubation tube. In other embodiments, the device shown in FIG. 8 can be attached to other medical instrumentation or equipment. In yet another embodiment, the device shown in FIG. 8 is standalone. In some embodiments, the device includes a shield or protective covering for the endotracheal intubation tube.

Embodiment of the device in FIG. 8 is operable to sense a temperature with temperature sensing element 802 or with fiber optic sensing element 804. It is then operable to transmit the sensed data to main unit 814 at which point the processor with the memory and computer program instructions are operable to determine whether to activate the warning light 808 and/or the audible warning 810. In one embodiment, the warning light 808 and/or audible warning 810 are activated in response to the sensed data being above a predetermined threshold.

Figure 9:
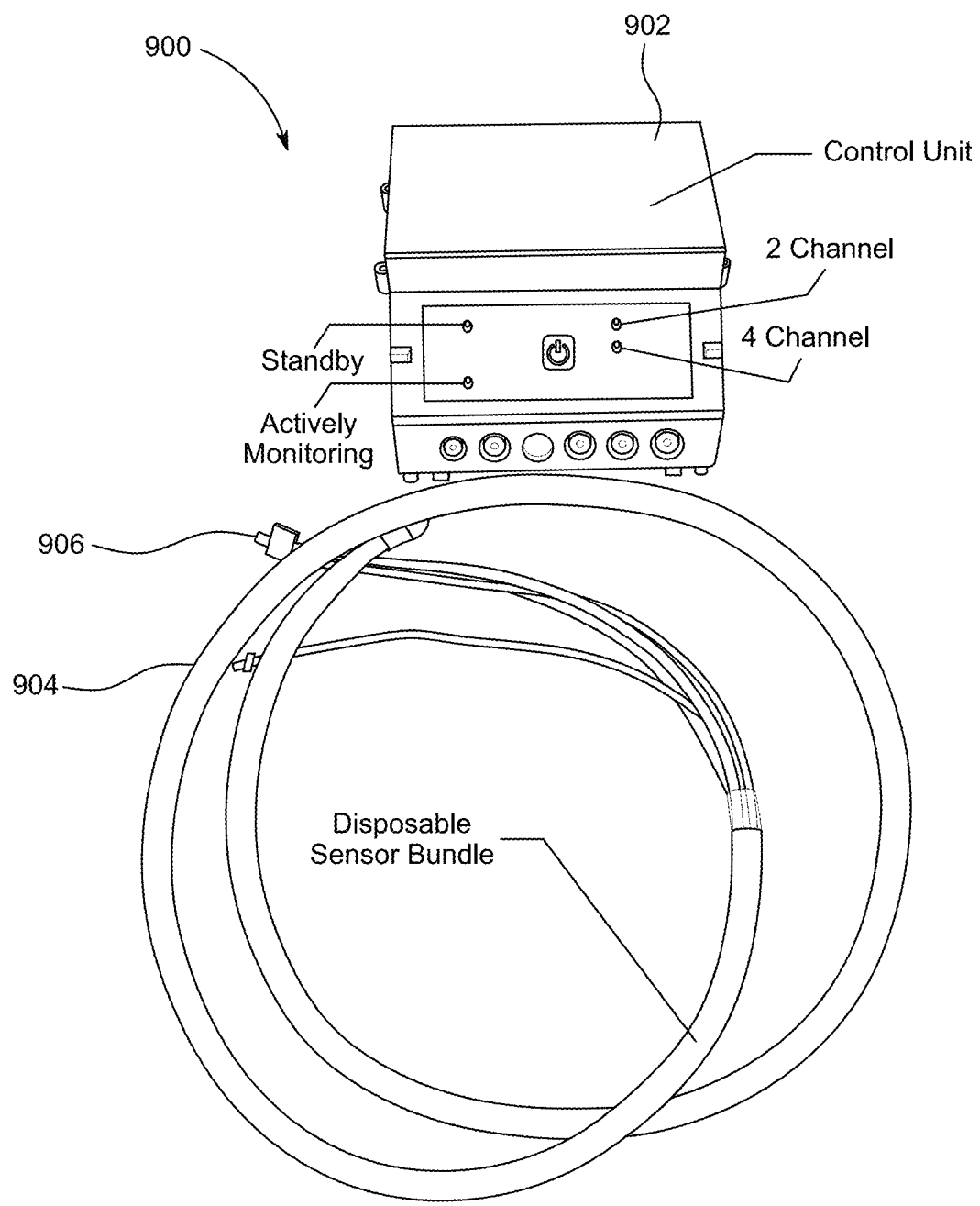
FIG. 9 presents an exemplary remote sensing system for performing exemplary embodiments of the present disclosure.

Referring to FIG. 9, shown is an exemplary sensing device 900 operable for sensing at a monitoring site. Shown in FIG. 9 is communication line 904 coupled to sensors 906. Communication line 904 is operable to be connected to main unit 902 (or control unit). Main unit 902 includes an on/off switch, a processor, a memory including computer program instructions, and warning lights. The processor is operable to receive sensor data from sensors 906 and to determine whether concentrations of gas or oxygen are above a predetermined threshold. If the concentrations are above a predetermined threshold, the processor is operable to activate the warning lights.

The sensors disclosed in the present invention, in addition to mounting on the trocar or electrosurgical device, may be incorporated into surgical drapes defining the perimeter of the surgical site for the surgical procedure.

The present invention contemplates that many changes and modifications may be made. Therefore, while the presently-preferred form of the sensor system has been shown and described, and several modifications and alternatives presented, persons skilled in this art will readily appreciate that various additional changes and modifications may be made without departing from the spirit of the invention, as defined and differentiated by the following claims.

The invention claimed is:

1. An apparatus for sensing during medical procedures, the apparatus comprising:
   (a) a surgical device comprising a device user interface and a warning indicator that is (i) a visual warning indicator, and (ii) an audible warning indicator, the visual and the audible warning indicators operable to notify a user in response to sensed gases;
   (b) a control unit comprising a user interface, a power unit, a motor, a smoke evacuator, a warning element, a processor, and a memory including computer program instructions, the user interface operable to (i) select between an on or off setting for the surgical device, (ii) control the smoke evacuator, and (iii) activate or deactivate the warning element, the power unit operable to connect with a power source;
   (c) a gas sensor located on the surgical device, the gas sensor operable to sense a presence of gases; and
   (d) a conduit comprising a vacuum tube and a communication line, the vacuum tube fluidly coupled to the surgical device and the control unit, the communication line operable to transmit electronic signals between the surgical device, the control unit and the gas sensor,
   wherein the power unit is operable to provide power to the surgical device, the control unit and the gas sensor through the conduit, wherein the motor with the smoke evacuator is operable to urge a fluid to pass from the surgical device through the conduit to the control unit, wherein the control unit with the conduit and the surgical device are operable to remove smoke and debris from a surgical site relative to the surgical device, and wherein the gas sensor is operable to transmit sensor data to the control unit through the conduit, and wherein the control unit is operable to activate or deactivate (i) the visual warning indicator and the audible warning indicator located on the surgical device, and (ii) the warning element in response to sensed gases by the gas sensor.

2. The apparatus according to claim 1, wherein the gas sensor is operable to detect oxygen concentrations.

3. The apparatus according to claim 1, wherein the warning element comprises at least one of (i) a light indicator, and (ii) an audible indicator.

4. The apparatus according to claim 1, wherein the processor is operable to activate the warning element in response to sensed gas above a predetermined threshold.

* * * * *